US010545666B2

(12) United States Patent
Ahssini et al.

(10) Patent No.: US 10,545,666 B2
(45) Date of Patent: Jan. 28, 2020

(54) DATA STORAGE IN A FLASH MEMORY

(71) Applicant: PROTON WORLD INTERNATIONAL N.V., Diegem (BE)

(72) Inventors: Youssef Ahssini, Vilvoorde (BE); Guy Restiau, Ramillies (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 86 days.

(21) Appl. No.: 15/169,547

(22) Filed: May 31, 2016

(65) Prior Publication Data

US 2017/0185308 A1    Jun. 29, 2017

(30) Foreign Application Priority Data

Dec. 28, 2015  (FR) ..................... 15 63377

(51) Int. Cl.
*G06F 3/06*    (2006.01)
*G06F 12/02*   (2006.01)
*G06F 12/08*   (2016.01)

(52) U.S. Cl.
CPC ............ *G06F 3/0605* (2013.01); *G06F 3/064* (2013.01); *G06F 3/0631* (2013.01); *G06F 3/0659* (2013.01); *G06F 3/0665* (2013.01); *G06F 3/0679* (2013.01); *G06F 12/0246* (2013.01); *G06F 12/08* (2013.01); *G06F 2212/152* (2013.01); *G06F 2212/214* (2013.01); *G06F 2212/657* (2013.01); *G06F 2212/7202* (2013.01)

(58) Field of Classification Search
CPC ...... G06F 3/0605; G06F 3/0631; G06F 3/064; G06F 3/0659; G06F 3/0665; G06F 3/0679; G06F 12/0246; G06F 12/08; G06F 13/42; G06F 13/4234; G06F 2212/152; G06F 2212/214; G06F 2212/657; G06F 2212/7202; H04W 4/008
See application file for complete search history.

(56) References Cited

U.S. PATENT DOCUMENTS

| 5,043,866 | A | * | 8/1991 | Myre, Jr. ............ G06F 11/1471 |
| 5,455,944 | A | * | 10/1995 | Haderle ................ G06F 9/466 |
| 5,913,219 | A | | 6/1999 | Baek et al. |
| 6,075,929 | A | * | 6/2000 | MacLaren ........... G06F 12/0215 710/107 |

(Continued)

FOREIGN PATENT DOCUMENTS

| CN | 101154281 A | 4/2008 |
| WO | 03/096226 A1 | 11/2003 |

OTHER PUBLICATIONS

Search Report for FR 1563377, dated Aug. 11, 2016 (2 pages).

*Primary Examiner* — Mano Padmanabhan
*Assistant Examiner* — William E. Baughman
(74) *Attorney, Agent, or Firm* — Seed Intellectual Property Law Group LLP

(57) ABSTRACT

Data is stored in a non-volatile memory during an off-line transaction between a circuit containing memory and a terminal. A page of the memory is assigned to each transaction, and the data of each transaction is stored sequentially in the corresponding page. The page assigned to each transaction is locked in a write mode at the end of the corresponding transaction.

18 Claims, 1 Drawing Sheet

(56) References Cited

U.S. PATENT DOCUMENTS

| | | | | |
|---|---|---|---|---|
| 6,078,520 | A * | 6/2000 | Tobita | G06F 11/1433 365/185.09 |
| 6,427,912 | B1 * | 8/2002 | Levasseur | G06Q 20/346 235/380 |
| 6,738,749 | B1 * | 5/2004 | Chasko | G06Q 20/105 705/16 |
| 6,913,193 | B1 * | 7/2005 | Kawan | G06Q 20/341 235/380 |
| 2007/0158439 | A1 * | 7/2007 | Conner | G06K 7/0008 235/492 |
| 2008/0244161 | A1 * | 10/2008 | Yamada | G06F 12/0284 711/100 |
| 2009/0143104 | A1 * | 6/2009 | Loh | G06Q 20/32 455/558 |
| 2010/0280958 | A1 * | 11/2010 | Hasson | G06Q 20/40 705/75 |
| 2013/0103523 | A1 * | 4/2013 | Okonkwo | G06Q 20/352 705/26.1 |
| 2015/0117106 | A1 * | 4/2015 | Van Keer | G06F 12/0246 365/185.12 |

* cited by examiner

DATA STORAGE IN A FLASH MEMORY

This application claims the priority benefit of French patent application number 15/63377, filed on Dec. 28, 2015.

BACKGROUND

Technical Field

The present disclosure generally relates to electronic circuits and, more specifically, to circuits using a flash memory. The present disclosure is more particularly directed to data storage management in a flash memory.

Description of the Related Art

Flash memories are increasingly used in microcontrollers to non-volatilely store data.

Data storage in a flash memory has various time constraints due to the granularity of the operations performed, the writing and the reading being performed by byte, while the reading and especially the erasing are performed by page.

In certain applications, is it desired to ascertain that the transactions performed and stored respect an atomicity criterion. The atomicity of a transaction corresponds to ascertaining that data stored in a memory effectively have a processable state. This amounts to ascertaining that data in the non-volatile memory have either their state before the transaction or their state after the concerned transaction but that they do not have an intermediate state.

Transaction atomicity management is particularly used in applications where an interruption of the circuit power supply or the occurrence of an incidental or intentional disturbance may generate the storage of data in a state which makes them either impossible to subsequently process or vulnerable in terms of confidentiality.

Many atomicity management techniques, more particularly in microcontrollers applied to so-called security transactions, for example, bank transactions, access control, etc., are known.

BRIEF SUMMARY

It would be desirable to have a solution of data storage in a flash memory that respects the criterion of atomicity of the manipulated data.

It would be desirable to have a solution particularly adapted to transactions based on contactless communications.

Thus, an embodiment provides a method of data storage in a non-volatile memory, during an off-line transaction between a circuit containing said memory and a terminal, wherein:

a page of the memory is assigned to each transaction;

the data of each transaction are stored sequentially in the corresponding page; and the page assigned to a transaction is locked in write mode at the end of the corresponding transaction.

According to an embodiment, a counter, also stored in a non-volatile memory, is updated at the end of each transaction.

According to an embodiment, the counter is a counter of the number of transactions.

According to an embodiment, a storage of data of a new transaction is only allowed if the counter has not reached a threshold corresponding to the number of pages of the memory assigned to transactions.

An embodiment provides a method of managing a non-volatile memory having data stored therein by application of the above method, wherein, during a communication between said circuit and a distant server via a terminal:

the data contained in the pages are read and uploaded into the distant server; and the read pages are erased.

According to an embodiment, the counter is reset once all pages have been processed.

An embodiment provides a flash memory programmed according to the above method.

An embodiment provides an electronic circuit comprising a flash memory.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
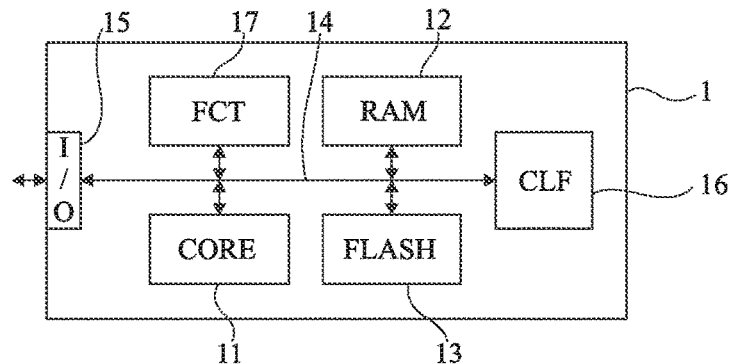
FIG. 1 is a block diagram of an exemplary electronic circuit of the type to which the embodiments which will be described apply.

The same elements have been designated with the same reference numerals in the different drawings.

For clarity, only those steps and elements which are useful to the understanding of the embodiments which will be described have been shown and will be detailed. In particular, the electric behavior of a flash memory during write, read, and erase steps has not been detailed, the described embodiments being compatible with usual flash memory technologies. Further, the applications using an atomicity management have not been detailed either, the described embodiments being here again compatible with usual applications.

In the following description, when reference is made to terms approximately, about, and in the order of, this means to within 10%, preferably to within 5%.

FIG. 1 very schematically shows, in the form of blocks, an embodiment of an electronic circuit 1 of the type to which the embodiments which will be described apply as an example.

Circuit 1 comprises:

a processing unit 11 (CORE), for example, a state machine, a microprocessor, a programmable logic circuit, etc.;

one or a plurality of volatile storage areas 12 (RAM), for example of RAM or register type, to temporarily store information (instructions, addresses, data) during processings;

one or a plurality of non-volatile storage areas 13, including at least one flash-type memory (FLASH) for durably storing information, in particular when the circuit is not powered;

one or a plurality of data, address, and/or control buses 14 between the different elements internal to circuit 1; and an input/output interface 15 (I/O) of communication, for example, of series bus type, with the outside of circuit 1.

In applications more specifically targeted by the present disclosure, circuit 1 also integrates a contactless communication circuit 16 (CLF—ContactLess Front-end), of near-field communication type (NFC).

Further, circuit 1 may integrate other functions, symbolized by a block 17 (FCT), according to the application, for example, a crypto-processor, other interfaces, other memories, etc.

The management of the atomicity of transactions in a circuit equipped with a flash memory is particular since the flash memory has a page processing granularity rather than a bit or byte processing granularity, in particular for erasing. A flash memory is programmed from an initial state to states 0 (non-conductive states of the cells). This means that the memory cells should be set to a high state and that, to store a piece of data, it is chosen either not to act on the bit state, or to program the bit to 0. An erasing (resetting to the high initial state) is necessarily performed by memory page. A page is defined as being the minimum size capable of being simultaneously addressed to be erased. Typically, a page currently amounts, in a flash memory, to 32, 64, 128, 256, or 512 bytes. In practice, this corresponds to the size of a register receiving the data in series to transfer them in parallel to the memory plane for storage.

To guarantee the atomicity of transactions, the data storage in the flash memory should only be performed once the transaction is over and the data are said to be stable. In practice, atomicity management methods activate an indicator of the processing of data when said data are extracted from the non-volatile memory, and then organize the storage of the updated data, once the processing is over, the processing indicator then switching state. The atomicity may concern a larger or smaller quantity of data (bytes) according to the nature of the transaction.

The atomicity of transactions is particularly important in the case of bank-type transactions (payment, for example) where it is necessary to ascertain that the information stored in the flash memory, for example, the balance of an electronic purse or of a purchase authorization, or the identifier validating a transaction, is reliably stored. This is important for transactions carried out off line, that is, with no communication with a bank server. Indeed, for transactions performed off line, the authorizations are directly managed by the payment circuit and it should be ensured that the transactions are properly stored. A specific example relates to so-called EMV transactions (EUROCARD, MASTERCARD, VISA).

In contactless applications, transactions have to be carried out very rapidly due to the fugacity of the communication, which depends on the time during which circuit 1 can communicate with a terminal. Now, managing the atomicity of transactions takes time, as well as the erase operations which are necessary in a flash memory to authorize a programming.

The flash memory is more particularly used in off-line transactions to store information relative to the transactions until the circuit is on line (with or without contact) with a server for which this information is intended. When the circuit is in an on-line communication, the transactions are uploaded into the server and the corresponding areas of the flash memory are erased. Thus, the memory space is freed again to store new off-line transactions.

In particular, for EMV applications, the circuit contains a counter of the number of authorized off-line transactions and/or a counter of the maximum authorized amount, which is decremented as the amount is being consumed off line. During an on-line connection, the counter of the number of transactions is reset and the counter of the maximum amount is updated based on the information of the bank server.

According to an embodiment, one provides, among others:

assigning a page of the flash memory to each transaction;

writing the data relative to an off-line transaction sequentially into the page assigned to this transaction;

storing the page used at the end of the transaction and forbidding its off-line updating once the transaction is ended; and erasing the pages of the flash memory during an on-line transaction.

Thus, it is refrained from performing flash memory erasing operations during periods when transactions are carried out off line and which form critical periods in terms of time.

Figure 2:
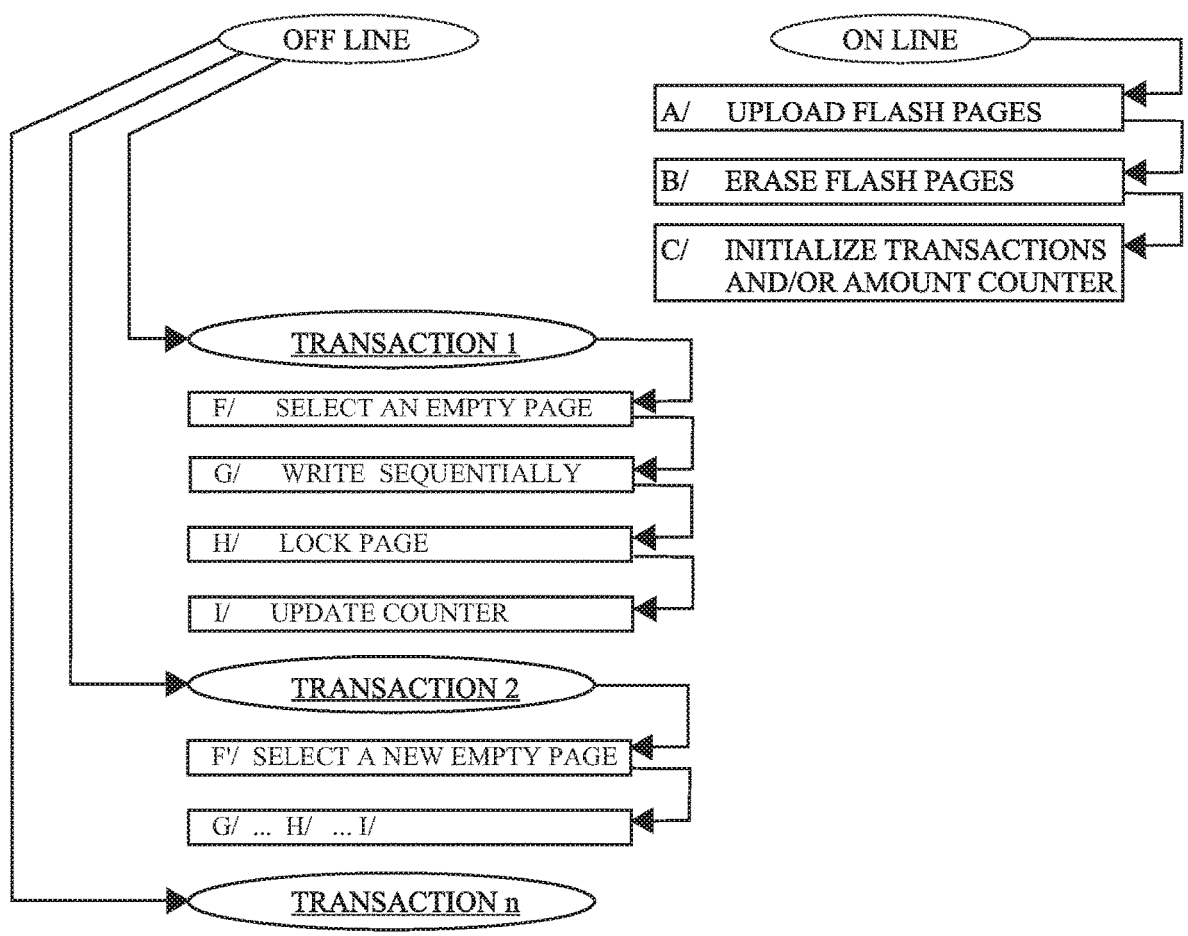
FIG. 2 very schematically illustrates in the form of blocks an embodiment of a method of managing the storage in a flash memory of the circuit of FIG. 1.

FIG. 2 is a block diagram illustrating an embodiment of such a method of flash memory storage management.

FIG. 2 synthesizes in its left-hand side the operations performed off line and in its right-hand side those performed on line.

Once the circuit communicates on line, be it by contact (for example, introduction of a bank card into a cash dispenser) or without contact, the pages of the flash memory are read from, that is, the pages of the flash memory are uploaded into the server (A/ UPLOAD FLASH PAGES). Then, the uploaded pages are erased (B/ ERASE FLASH PAGES). This operation is relatively long as compared with the read and write operations, but it is only performed when the circuit communicates on line, that is, when it has more time. Indeed, when all pages have been erased, the terminal communicating with circuit 1 causes the resetting of the counter of authorized off-line transactions and/of the authorized floor limit (C/ INITIALIZE TRANSACTIONS AND/OR AMOUNT COUNTER).

Circuit 1 is then ready for a new off-line transaction phase. For such off-line transactions, circuit 1 (in practice, its processing unit 11 which controls all the operations) selects, for each new transaction (TRANSACTION 1, TRANSACTION 2, TRANSACTION n), an empty page in the flash memory (F/ SELECT AN EMPTY PAGE).

The transaction is then performed by implementing, preferably, an atomicity management so that the information which is stored therein respects the criterion of being either in the initial state, or in the final state of the concerned data. Any atomicity algorithm may be used, provided that it does not impose erasing memory 13 in an off-line operation. The data relative to the transaction are sequentially stored in the page (G/ WRITE SEQUENTIALLY), which decreases access times with respect to a non-sequential storage.

Once the transaction is over, the page is locked (H/ LOCK PAGE) even if it is not full. In other words, the possible residual space in the page cannot be used to store, even partially, another transaction. Further, the counter of the number of transactions and/or the counter of the maximum amount is updated (I/ UPDATE COUNTER), that is, decremented or incremented according to the threshold (minimum value or maximum value) with respect to which the control is performed.

In the case of a counter of the number of transactions, this number is a function of the number of pages in the flash memory assigned to the transactions (for example, from 3 to 50).

If this number is reached (or if the amount threshold is reached), no new off-line transaction is authorized and a new on-line connection (steps A to C) is necessary so that the circuit can operate off line again.

The described embodiment takes advantage from the difference between the programming time and the erasing time. In practice, in a flash memory, the page erasing operation is relatively long (typically in the order of a few milliseconds) as compared with a byte programming operation (typically in the order of some ten microseconds).

Advantage is also taken from the fact that a flash memory is written into by byte, which makes the processing of a transaction by sequential writing into the flash memory compatible with the respecting of an atomic character of transactions. The fact for the reading to be performed, in a flash memory, by full page, is not prejudicial since the reading is performed on line.

The selection of the page size depends on the application and on the maximum size necessary to store a transaction.

An advantage of the embodiments which have been described is that they improve the management of a flash memory in off-line transactions between a circuit integrating a flash memory and a terminal.

Another advantage is a compatibility with bank transactions, for example, of EMV type.

Another advantage of the described embodiments is that they do not adversely affect the atomicity of the writing of a transaction into the memory.

Various embodiments have been described. Various alterations, modifications, and improvements will occur to those skilled in the art. In particular, although the embodiments have been more specifically described in relation with an example of application to EMV-type transactions and to a flash memory, they transpose to other applications and memories where similar problems are posed. Further, the practical implementation of the described embodiments is within the abilities of those skilled in the art based on the functional indications given hereabove and by using circuits usual per se. Particularly, the organization of the memory addressing and the generation of the signals adapted to the control of said memory and to this addressing use techniques usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   storing data in a non-volatile memory during off-line transactions between a circuit containing the non-volatile memory and at least one terminal, the storing including:
   assigning a first page of the non-volatile memory exclusively to a first off-line transaction of the off-line transactions;
   storing data associated with the first off-line transaction sequentially in the first page assigned exclusively to the first off-line transaction;
   locking the first page, assigned exclusively to the first off-line transaction, in a write mode after completion of the first off-line transaction, wherein the write mode does not allow erasing of the first page while the circuit is off-line and the first page remains locked until the circuit goes on-line;
   after completion of the first off-line transaction and while the first page remains locked and exclusively assigned to the first off-line transaction, assigning a second page of the non-volatile memory exclusively to a second off-line transaction of the off-line transactions;
   storing data associated with the second off-line transaction sequentially in the second page assigned exclusively to the second off-line transaction;
   locking the second page, assigned exclusively to the second off-line transaction, in the write mode after completion of the second off-line transaction, wherein the write mode does not allow erasing of the second page while the circuit is off-line.

2. The method of claim 1, comprising:
   after the completion of each offline transaction, updating a counter in the non-volatile memory.

3. The method of claim 2, wherein the counter maintains a numerical count of off-line transactions.

4. The method of claim 3, comprising:
   storing data of a new off-line transaction in the non-volatile memory only if the counter has not reached a threshold, wherein the threshold corresponds to a number of pages of the non-volatile memory permitted to store data of off-line transactions.

5. The method of claim 1, comprising:
   establishing a communicative connection between said circuit and a distant server via a second terminal;
   communicating the data associated with each off-line transaction contained in the assigned pages of the non-volatile memory to the distant server; and
   erasing the data associated with each off-line transaction from the assigned pages.

6. The method of claim 5, comprising:
   after the completion of each offline transaction, updating a counter in the non-volatile memory; and
   resetting the counter after communicating the data associated with each off-line transaction contained in the assigned pages of the non-volatile memory to the distant server.

7. The method of claim 1, wherein the non-volatile memory is a flash memory.

8. An electronic circuit, comprising:
   a first memory;
   a second memory, the second memory being a non-volatile memory;
   a communication circuit;
   at least one computer bus; and
   a processing unit coupled to the first memory, the second memory, and the communication circuit via the at least one computer bus, wherein the processing unit is arranged to direct a plurality of off-line transactions between the electronic circuit and at least one terminal, the directing for each of the plurality of off-line transactions includes:
   assigning a first page of the second memory exclusively to a first off-line transaction of the off-line transactions;

storing data associated with the first off-line transaction in the first page assigned exclusively to the first off-line transaction;

after completing the first off-line transaction and storing the associated data, locking in a write mode the first page assigned exclusively to the first off-line transaction, wherein the write mode does not allow erasing of the first page while the circuit is off-line and the first page remains locked until the circuit goes on-line;

after completion of the first off-line transaction and while the first page remains locked and exclusively assigned to the first off-line transaction, assigning a second page of the second memory exclusively to a second off-line transaction of the off-line transactions;

storing data associated with the second off-line transaction sequentially in the second page assigned exclusively to the second off-line transaction;

locking the second page, assigned exclusively to the second off-line transaction, in the write mode after completion of the second off-line transaction, wherein the write mode does not allow erasing of the second page while the circuit is off-line.

9. The electronic circuit according to claim 8, wherein the directing for each of the plurality of off-line transactions further comprises:

updating a counter in the second memory, the counter arranged to maintain a numerical count of off-line transactions.

10. The electronic circuit according to claim 9, wherein the directing for each of the plurality of off-line transactions further comprises:

prior to storing data associated with the respective off-line transaction in the sequentially assigned different portion, verifying that the counter has not reached a threshold, wherein the threshold corresponds to a number of permitted off-line transactions.

11. The electronic circuit according to claim 9, wherein the processing unit is arranged to direct a transfer of data from the second memory, wherein directing the transfer of data from the second memory comprises:

establishing a communicative connection between the electronic circuit and a distant server through the communications circuit;

communicating data associated with each off-line transaction stored in the second memory to the distant server; and erasing the data associated with each off-line transaction from the second memory.

12. The electronic circuit according to claim 11, wherein directing the transfer of data from the second memory further comprises:

resetting the counter after communicating the data associated with each off-line transaction stored in the second memory.

13. The electronic circuit according to claim 8, wherein the second memory is a flash memory.

14. The electronic circuit according to claim 8, wherein the communications circuit is a wireless communications circuit.

15. The electronic circuit according to claim 14, wherein the communications circuit includes a contactless front-end.

16. A method, comprising:

assigning a first sequential page of a flash memory exclusively to a first off-line transaction;

writing data associated with the first off-line transaction to first sequential page assigned exclusively to the first off-line transaction; and locking into a write mode the first sequential page assigned exclusively to the first off-line transaction after completion of the first off-line transaction, wherein the write mode prevents erasing of the first sequential page while the circuit is off-line and the first sequential page remains locked until the circuit goes on-line;

after completion of the first off-line transaction and while the first page remains locked and exclusively assigned to the first off-line transaction, assigning a second sequential page of a flash memory exclusively to a second off-line transaction;

writing data associated with the second off-line transaction to second sequential page assigned exclusively to the second off-line transaction; and locking into the write mode the second sequential page assigned exclusively to the second off-line transaction after completion of the second off-line transaction, wherein the write mode prevents erasing of the second sequential page while the circuit is off-line and the second sequential page remains locked until the circuit goes on-line.

17. The method according to claim 16, comprising:

prior to writing data associated with each of the first and second off-line transactions, verifying a counter has not reached a determined threshold, the determined threshold representing a maximum number of permitted off-line transactions; and updating the counter at least once in association with each of the first and second off-line transactions.

18. The method according to claim 17, comprising:
establishing an on-line transaction;
erasing the first and second sequential pages of the flash memory during the on-line transaction; and
resetting the counter.

* * * * *